US012678877B2

(12) United States Patent
Tracy et al.

(10) Patent No.: US 12,678,877 B2
(45) Date of Patent: Jul. 14, 2026

(54) ELECTRON BEAM BRAZING TO REPAIR COMPONENT

(71) Applicant: Pratt & Whitney Canada Corp., Longueuil (CA)

(72) Inventors: Kevin M. Tracy, Wichita Falls, TX (US); Charles Trent Daulton, Burkburnett, TX (US)

(73) Assignee: PRATT & WHITNEY CANADA CORP., Longueuil (CA)

( * ) Notice: Subject to any disclaimer, the term of this patent is extended or adjusted under 35 U.S.C. 154(b) by 353 days.

(21) Appl. No.: 18/343,074

(22) Filed: Jun. 28, 2023

(65) Prior Publication Data

US 2025/0001511 A1      Jan. 2, 2025

(51) Int. Cl.
  *B23K 1/00*          (2006.01)
  *B23K 1/005*        (2006.01)
(52) U.S. Cl.
  CPC .................................. B23K 1/0056 (2013.01)
(58) Field of Classification Search
  CPC ................ B23K 1/0018; B23K 20/026; B23K 35/0238; B23K 35/0222; B23K 35/02; B23K 35/0244
  See application file for complete search history.

(56) References Cited

U.S. PATENT DOCUMENTS

| | | | |
|---|---|---|---|
| 8,584,357 B2 | 11/2013 | Richter et al. | |
| 11,426,797 B2 | 8/2022 | Brunhuber et al. | |
| 11,565,336 B2 * | 1/2023 | Lopshire | F01D 5/187 |
| 11,795,832 B2 * | 10/2023 | Ozbaysal | F01D 9/02 |
| 11,994,040 B2 * | 5/2024 | Kulkarni | B23K 1/0018 |
| 2017/0297101 A1 | 10/2017 | Casper et al. | |
| 2017/0320174 A1 * | 11/2017 | Mottin | F01D 5/005 |

FOREIGN PATENT DOCUMENTS

WO        2008/125497 A1      10/2008

OTHER PUBLICATIONS

Computer English Translation of JP2014055543A (Year: 2014).*
European Search Report for EP Application No. 24185555.0 dated Dec. 20, 2024.

* cited by examiner

*Primary Examiner* — Erin B Saad
(74) *Attorney, Agent, or Firm* — Carlson, Gaskey & Olds, P.C.

(57)          ABSTRACT

A method of repairing a component includes the steps of identifying a component to be repaired, and an area on the component in need of repair. Next, one places the component into a chamber, and deposits braze material at the area. Next, one applies an electron beam focused on a portion of the area to sinter the braze material that has been deposited at the area. Finally, one places the component into a furnace to melt and diffuse the braze powder into the component.

19 Claims, 4 Drawing Sheets

ELECTRON BEAM BRAZING TO REPAIR COMPONENT

BACKGROUND

This application relates to the use of electron beam additive manufacturing systems with braze materials to repair damage to components such as gas turbine engine airfoils.

Gas turbine engine airfoils have complex shapes, and are subject to challenging environmental conditions. This can result in cracks or other damage. In addition, areas may wear over time. It is known to repair such airfoil using any number of techniques.

One known technique is brazing. In brazing braze materials may be manually applied to fill the cracks or other surface irregularities, and then sintered into the component. More recently direct laser braze cladding has been proposed.

However, the known techniques require "line of sight" access to the damage. Many gas turbine engine components have areas that will be difficult to access utilizing these known techniques.

Electron beam additive manufacturing is also known. However, it has typically been utilized with welding, which is not acceptable for certain parts due to the high temperatures.

SUMMARY

A method of repairing a component includes the steps of identifying a component to be repaired, and an area on the component in need of repair. Next, one places the component into a chamber, and deposits braze material at the area. Next, one applies an electron beam focused on a portion of the area to melt the braze material that has been deposited at the area. Finally, one places the component into a furnace to further melt and diffuse the braze powder into the component.

These and other features will be best understood from the following drawings and specification, the following is a brief description.

DETAILED DESCRIPTION

Figure 1A:
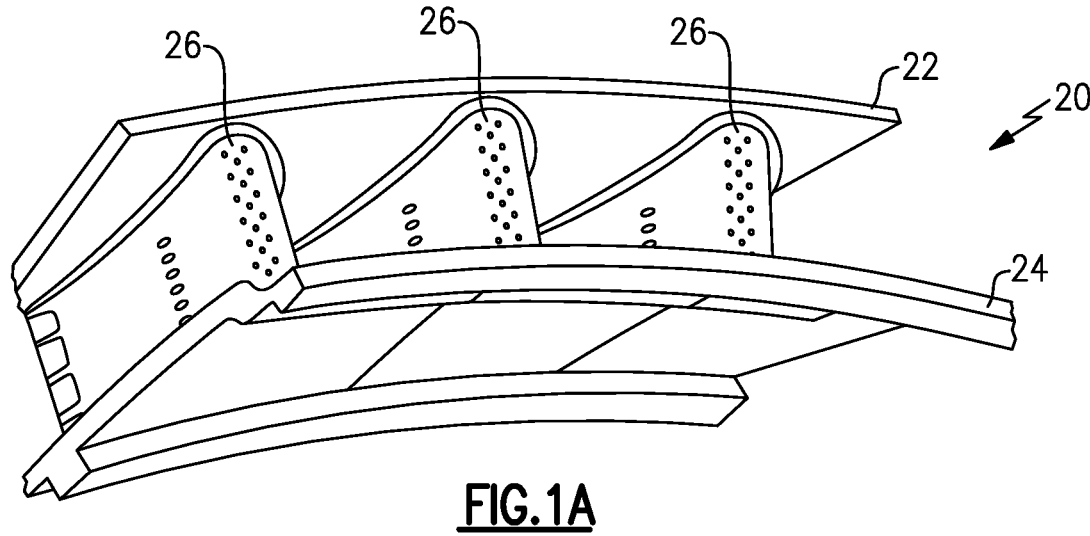
FIG. 1A shows a gas turbine engine component which may be repaired by the teachings of this disclosure.

FIG. 1A shows a gas turbine engine component 20 which may have a radially outer platform 22 and a radially inner platform 24. Three airfoils 26 extend radially between the platforms 22 and 24. Airfoils 26 may be static vanes. It should be understood the teachings of this disclosure extend to repair of other components.

Figure 1B:
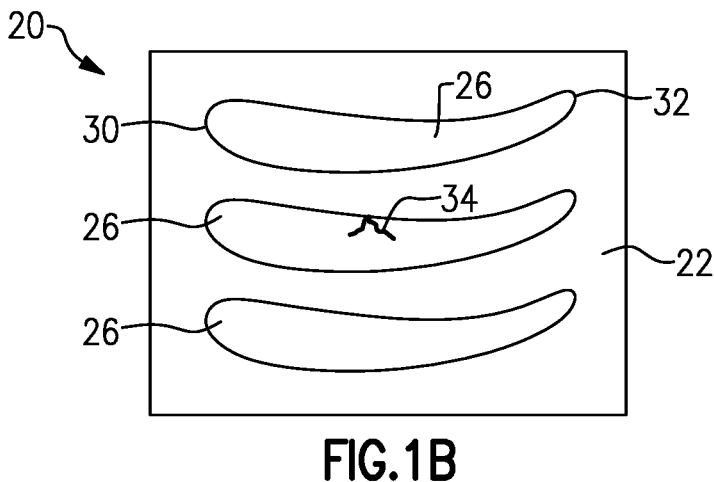
FIG. 1B shows damage to a portion of the FIG. 1A component.

As shown in FIG. 1B there is damage 34 such as a crack in a central airfoil 26. Each of the airfoils extend between a leading edge 30 and a trailing edge 32. As can be appreciated, the crack 34 would be difficult to access with several existing repair techniques. That is, many techniques require line of sight access to the area to be repaired. There will be no such access to crack 34.

Figure 1C:
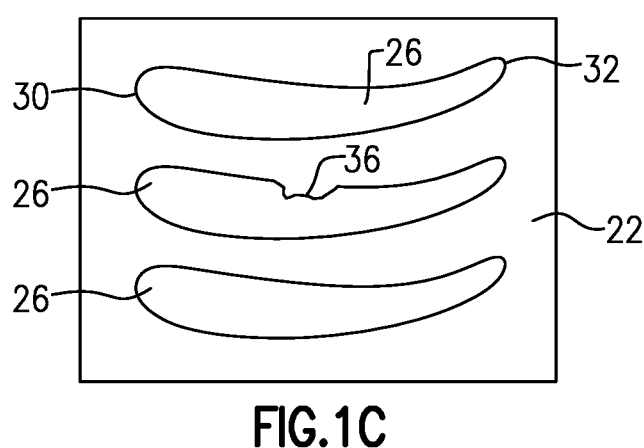
FIG. 1C shows another type of damage.

FIG. 1C shows another type of damage in the nature of wear 36 into an airfoil 26. Again, particularly when in a component such as component 20, area 36 may be difficult to access.

Figures 2A, 2B:
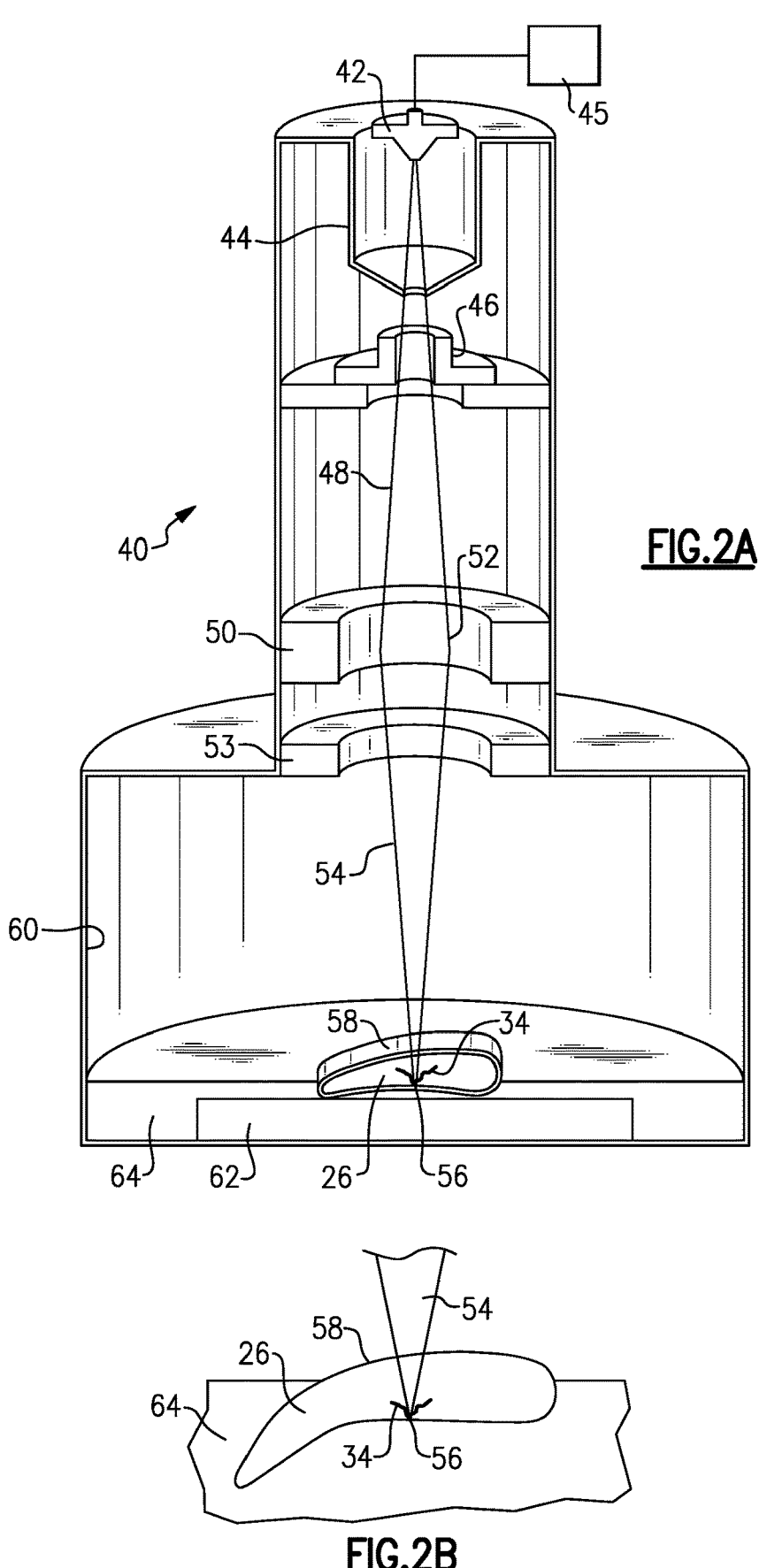
FIG. 2A shows a system for repairing the component.
FIG. 2B is an enlarged view of a portion of the FIG. 2A system.

A system 40 for repairing difficult to access areas is shown in FIG. 2A. System 40 includes an electron beam additive manufacturing system, as is known. However, the use of the system 40 is unique to this disclosure.

The electron beam additive manufacturing system includes an incandescent cathode 42. The cathode is positioned in a bias cup 44. Bias cup 44 is positioned above a primary anode 46. An electron beam 48 is shown expanding outwardly from the incandescent cathode 42. Beam 48 passes through a focusing coil 50, and as can be seen, at an apex 52 it begins to be focused as shown at 54 to a smaller area. The focused electron beam 54 passes through a deflection coil 53.

The focused beam 54 is directed through an outer surface 58 of an airfoil 26 and to a focus point 56. As can be seen the beam can pass through a body of the airfoil 26 such that focus point 56 can be set to crack 34 even though there is no line of sight access. As can be appreciated, the airfoil 26 could be a central airfoil such as in the component 20 of FIG. 1B.

The beam is focused within a vacuum chamber 60. A vibration bed 62 vibrates braze powder 64 to fill the crack or other damaged area on the airfoil 26. The use of the powder deposition through the vibration bed 62 may be as known.

While the component is illustrated as a static vane, the teachings of this disclosure would extend to other components having an airfoil such as blades, etc. In addition, the repair could be occurring at other areas of the component, such as the platforms.

FIG. 2B is a detail of FIG. 2A and shows the crack 34 being filled with braze material and the subject of focus at point 56.

Figure 3:
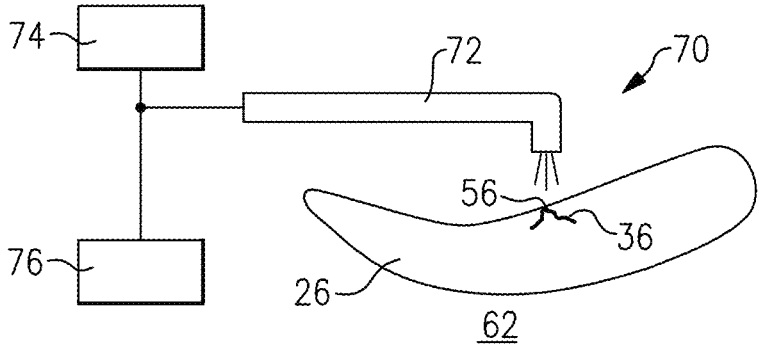
FIG. 3 shows an alternative embodiment.

FIG. 3 shows an alternative embodiment 70 wherein the powder is deposited by a tool 72 movable within a vacuum chamber. Tool 72 is provided with two bins 74 and 76 of distinct braze material. The FIG. 2A system could also be utilized with two distinct braze powders.

The first braze powder 74, for example, may be deposited on the component 26 to repair a first type of substrate defect such as, but not limited to, the crack 26. The second braze powder 76, by contrast, may be deposited with the component 26 to repair a second type of substrate defect such as, but not limited to, the wear region 36 of FIG. 1C.

More particularly, the first braze powder 74 may be provided (e.g., selected, formulated, etc.) for increased wettability, flowability and/or capillary penetration. The first braze powder may thereby be particularly suited for entering and filling voids. The second braze powder 76, on the other hand, may be provided (e.g., selected, formulated, etc.) for improved dimensional repair of the surface due to lower wettability and flowability. The second braze powder may thereby be particularly suited for forming claddings.

It is also contemplated the first braze powder 74 and the second braze powder 76 may be mixed together in some proportion to provide a combined braze powder with intermediate braze properties.

Examples of when the two powders could be mixed might be to achieve various proportions of the two. As an example, a designer might want a high-flow, a moderate-flow or a stiff final deposited powder. As one example, the second braze powder 76 may include higher proportions of a metal alloy powder relative to a braze material powder (e.g., 70/30). By contrast, the first braze powder 74 may include lower proportions of the metal alloy powder relative to the braze material powder (e.g., 30/70).

The first braze powder 74 may include a mixture of metal alloy powder (e.g., substrate powder) and braze material powder. The metal alloy powder may be selected to have a relatively high melting point and common or similar material properties as the substrate of component 26, e.g., an aluminum (Al) superalloy, a nickel (Ni) superalloy, a titanium (Ti) superalloy, etc. The braze material powder, on the other hand, may be selected to have a relatively low melting point, which is lower than the melting point of the metal alloy powder. The braze material powder, for example, may also include a common or similar base element as the substrate and/or the metal alloy powder (e.g., aluminum (Al), nickel (Ni) or titanium (Ti)) without the super alloying elements. The brazing material powder may also include boron (B), silicon (Si) and/or other melting point suppressants which may help facilitate melting and diffusion of the metal alloy powder with the substrate. The present disclosure, however, is not limited to the foregoing exemplary braze materials.

The second braze powder 76 may include a mixture of the metal alloy powder (e.g., substrate powder) and the braze material powder. A ratio of the metal alloy powder to the braze material powder in the second braze powder 76 may be greater than a ratio of the metal alloy powder to the braze material powder in the first braze powder 74.

For example, the second braze powder 76 may include higher proportions of the metal alloy powder relative to the braze material powder (e.g., 60/40). By contrast, the first braze powder 74 may include lower proportions of the metal alloy powder relative to the braze material powder (e.g., 30/70).

The present disclosure, however, is not limited to the foregoing exemplary braze powder makeups. In other embodiments, one or more or all of the constituent materials in the first braze powder may be different that one or more or all of the constituent materials in the second braze powder.

Figure 4:
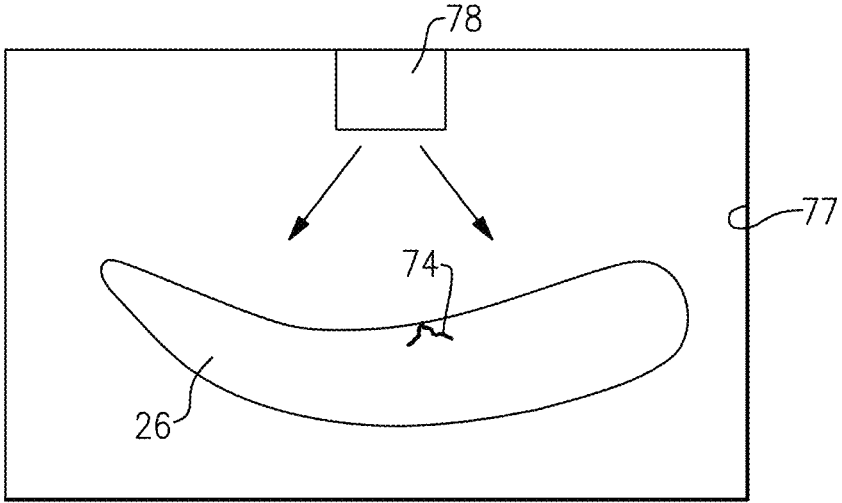
FIG. 4 shows a step in the repair process.

FIG. 4 shows a subsequent step after the braze material has been deposited to fill the crack and actuated by the electron beam to melt. The component is then placed within a vacuum furnace 77, and the material 74 is subject to high heat from a heating element 78. An example of the furnace may be vacuum pressure ranges as low as 0.1 micron and temperatures up to 2500° F. Of course other furnace parameters may be used.

Figure 5:
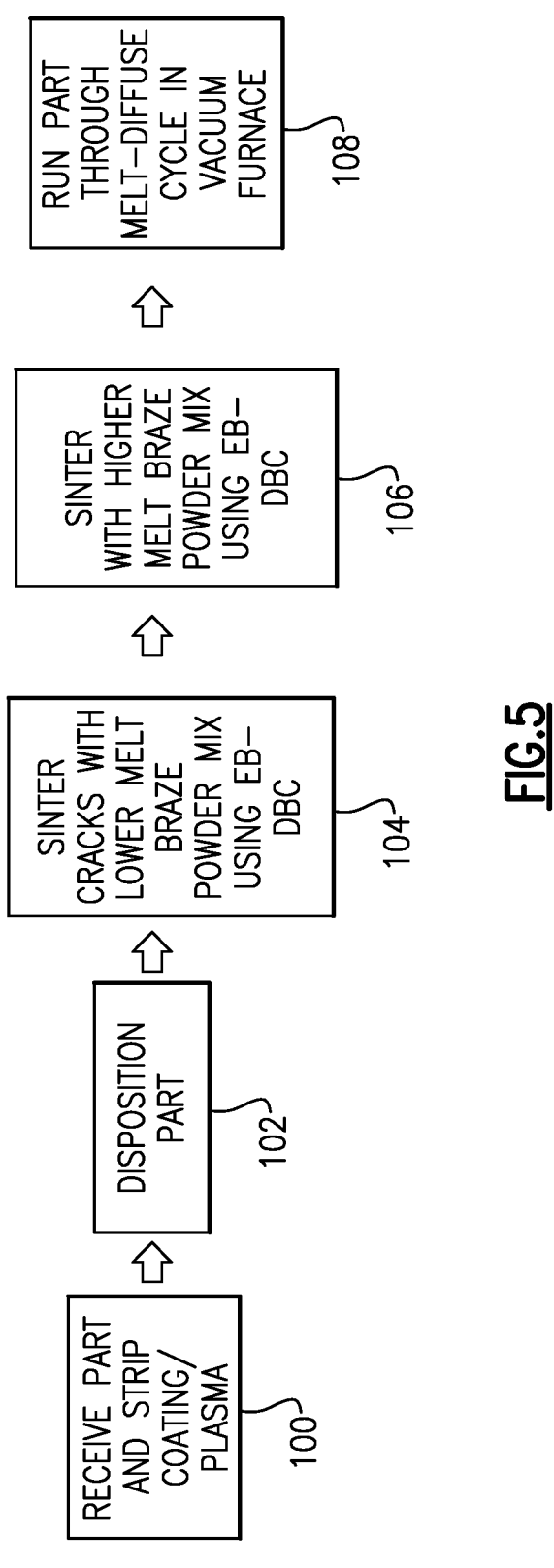
FIG. 5 is a flow chart.

A flow chart for the method of this disclosure is illustrated in FIG. 5. First, a part to be repaired is received, stripped of coating and cleaned, etc.

Plasma is a metal coating applied by a plasma arc spray used for surface build-up. It is a "band-aid" that must be removed prior to brazing. Plasma spray is a bonded coating. Diffused coatings and bonded coatings such as TBC and plasma must be removed before brazing.

Next, at step 102 the area to be repaired on the part is identified.

At step 104 the low braze melt material (74) may be utilized with electron beam brazing. At step 106 the higher melt brazing powder (76) may be utilized, again using electron beam brazing.

At step 108 the part is then placed into the vacuum furnace and ran through a melt/diffuse cycle.

A method of repairing a component under this disclosure could be said to include the steps of identifying a component to be repaired, and an area 102 on the component in need of repair. Next, one places the component into a chamber 60, and deposits braze material 104/106 into the area. Next, one applies an electron beam 40 focused on a portion of the area to sinter the braze material that has been deposited at the area. Finally, one places the component into a furnace 77 to melt and diffuse the braze powder into the component 108.

In another embodiment according to the previous embodiment, the furnace is a vacuum furnace.

In another embodiment according to any of the previous embodiments, the chamber is a vacuum chamber.

In another embodiment according to any of the previous embodiments, the component is placed within a bed of braze material 64 and subject to a vibration bed 62 to deposit the braze material at the area.

In another embodiment according to any of the previous embodiments, the component has a plurality of airfoils 26, and the area 34 is at a location where there is no line of sight access to the area.

In another embodiment according to any of the previous embodiments, two distinct braze materials 74/76 are deposited in distinct substeps of step 2.

In another embodiment according to any of the previous embodiments, one of the two distinct braze materials includes a higher portion of a metal alloy based upon a metal alloy of the component, and a lower proportion of a braze material powder, and the other of the two distinct braze materials includes a lower proportion of the metal alloy powder based upon a metal alloy forming the component and a higher percentage of the braze material powder.

In another embodiment according to any of the previous embodiments, the braze material is deposited from a deposit tool 72 onto the area to be repaired.

In another embodiment according to any of the previous embodiments, the component has a plurality of airfoils 26, and the area 34 is at a location where there is no line of sight access to the area.

In another embodiment according to any of the previous embodiments, two distinct braze materials 74/76 are deposited in distinct substeps of step 2) and one of two includes a higher portion of a metal alloy based upon a metal alloy of the component, and a lower proportion of a braze material powder, and an other of the two distinct braze materials includes a lower proportion of the metal alloy powder based upon a metal alloy forming the component and a higher percentage of the braze material powder.

In another embodiment according to any of the previous embodiments, the chamber is a vacuum chamber.

In another embodiment according to any of the previous embodiments, the component is placed within a bed of braze material 64 and subject to a vibration bed 62 to deposit the braze material at the area.

In another embodiment according to any of the previous embodiments, the component has a plurality of airfoils 26, and the area 34 is at a location where there is no line of sight access to the area.

In another embodiment according to any of the previous embodiments, two distinct braze materials 74/76 are deposited in distinct substeps of step 2) and one of two includes a higher portion of a metal alloy based upon a metal alloy of the component, and a lower proportion of a braze material powder, and an other of the two distinct braze materials includes a lower proportion of the metal alloy powder based upon a metal alloy forming the component and a higher percentage of the braze material powder.

In another embodiment according to any of the previous embodiments, the braze material is deposited from a deposit tool 72 onto the area to be repaired.

In another embodiment according to any of the previous embodiments, the component has a plurality of airfoils 26, and the area 34 is at a location where there is no line of sight access to the area.

In another embodiment according to any of the previous embodiments, the component is placed within a bed of braze material 64 and subject to a vibration bed 62 to deposit the braze material at the area.

In another embodiment according to any of the previous embodiments, the braze material is deposited from a deposit tool 72 onto the area to be repaired.

In another embodiment according to any of the previous embodiments, the component has a plurality of airfoils 26, and the area 34 is at a location where there is no line of sight access to the area.

In another embodiment according to any of the previous embodiments, two distinct braze materials 74/76 are deposited in distinct substeps of step 2) and one of two includes a higher portion of a metal alloy based upon a metal alloy of the component, and a lower proportion of a braze material powder, and an other of the two distinct braze materials includes a lower proportion of the metal alloy powder based upon a metal alloy forming the component and a higher percentage of the braze material powder.

Although embodiments have been disclosed, a worker of skill in this art would recognize that modifications would come within the scope of this disclosure. For that reason, the following claims should be studied to determine the true scope and content.

What is claimed is:

1. A method of repairing a component comprising the steps of:
   1) Identifying a component to be repaired, and an area on the component in need of repair;
   2) Placing the component into a chamber, and depositing braze material at the area;
   3) Applying an electron beam focused on a portion of the area to sinter the braze material that has been deposited at the area;
   4) Then placing the component into a furnace to melt and diffuse the braze powder into the component; and
wherein the component has a plurality of airfoils, and the area is at a location where there is no line of sight access to the area.

2. The method as set forth in claim 1, wherein the furnace is a vacuum furnace.

3. The method as set forth in claim 2, wherein the chamber is a vacuum chamber.

4. The method as set forth in claim 3, wherein the component is placed within a bed of braze material and subject to a vibration bed to deposit the braze material at the area.

5. A method of repairing a component comprising the steps of:
   1) Identifying a component to be repaired, and an area on the component in need of repair;
   2) Placing the component into a chamber, and depositing braze material at the area;
   3) Applying an electron beam focused on a portion of the area to sinter the braze material that has been deposited at the area;
   4) Then placing the component into a furnace to melt and diffuse the braze powder into the component; and wherein two distinct braze materials are deposited in distinct substeps of step 2) and one of two includes a higher percentage of a metal alloy based upon a metal alloy of the component, and a lower percentage of a braze material powder, and an other of the two distinct braze materials includes a lower percentage of the metal alloy powder based upon a metal alloy forming the component and a higher percentage of the braze material powder.

6. The method as set forth in claim 4, wherein two distinct braze materials are deposited in distinct substeps of step 2.

7. The method as set forth in claim 6, wherein one of the two distinct braze materials includes a higher percentage of a metal alloy based upon a metal alloy of the component, and a lower percentage of a braze material powder, and the other of the two distinct braze materials includes a lower percentage of the metal alloy powder based upon a metal alloy forming the component and a higher percentage of the braze material powder.

8. The method as set forth in claim 4, wherein the braze material is deposited from a deposit tool into the bed.

9. The method as set forth in claim 8, wherein the component has a plurality of airfoils, and the area is at a location where there is no line of sight access to the area.

10. The method as set forth in claim 8, wherein two distinct braze materials are deposited in distinct substeps of step 2) and one of two includes a higher portion of a metal alloy based upon a metal alloy of the component, and a lower proportion of a braze material powder, and an other of the two distinct braze materials includes a lower proportion of the metal alloy powder based upon a metal alloy forming the component and a higher percentage of the braze material powder.

11. The method as set forth in claim 1, wherein the chamber is a vacuum chamber.

12. The method as set forth in claim 11, wherein the component is placed within a bed of braze material and subject to a vibration bed to deposit the braze material at the area.

13. The method as set forth in claim 12, wherein the component has a plurality of airfoils, and the area is at a location where there is no line of sight access to the area.

14. The method as set forth in claim 13, wherein two distinct braze materials are deposited in distinct substeps of step 2) and one of two includes a higher percentage of a metal alloy based upon a metal alloy of the component, and a lower percentage of a braze material powder, and an other of the two distinct braze materials includes a lower percentage of the metal alloy powder based upon a metal alloy forming the component and a higher percentage of the braze material powder.

15. The method as set forth in claim 12, wherein the braze material is deposited from a deposit tool into the bed.

16. The method as set forth in claim 15, wherein the component has a plurality of airfoils, and the area is at a location where there is no line of sight access to the area.

17. The method as set forth in claim 1, wherein the component is placed within a bed of braze material and subject to a vibration bed to deposit the braze material at the area.

18. The method as set forth in claim 1, wherein the braze material is deposited from a deposit tool onto the area to be repaired.

19. The method as set forth in claim 5, wherein the component has a plurality of airfoils, and the area is at a location where there is no line of sight access to the area.

* * * * *